(12) United States Patent
Harrell

(10) Patent No.: US 6,382,698 B1
(45) Date of Patent: May 7, 2002

(54) PICK-UP TRUCK TONNEAU COVER

(75) Inventor: Terry R. Harrell, Rochester, MI (US)

(73) Assignee: American Plastics Processing Products, Inc., Mt. Clemens, MI (US)

( * ) Notice: Subject to any disclaimer, the term of this patent is extended or adjusted under 35 U.S.C. 154(b) by 0 days.

(21) Appl. No.: 09/822,879

(22) Filed: Mar. 30, 2001

Related U.S. Application Data
(60) Provisional application No. 60/193,792, filed on Mar. 31, 2000.

(51) Int. Cl.$^7$ .................................................. B60P 7/02
(52) U.S. Cl. ................................... 296/100.06; 296/189
(58) Field of Search ....................... 296/100.01, 100.02, 296/100.06, 100.07, 100.1, 189

(56) References Cited

U.S. PATENT DOCUMENTS

| | | |
|---|---|---|
| 2,911,254 A | 11/1959 | Schumacher |
| 4,036,521 A | 7/1977 | Clenet |
| 4,060,273 A | 11/1977 | Neville |
| 4,284,303 A | 8/1981 | Hather |
| 4,523,784 A | 6/1985 | Aspen |
| 4,740,029 A | 4/1988 | Tuerk |
| 4,762,360 A | 8/1988 | Huber |
| 5,058,652 A | 10/1991 | Wheatley et al. |
| RE33,790 E | 1/1992 | Huber |
| 5,251,951 A | 10/1993 | Wheatley |
| 5,558,392 A | 9/1996 | Young |
| 5,636,893 A | 6/1997 | Wheatley et al. |
| 5,688,017 A | 11/1997 | Bennett |
| 5,860,547 A | 1/1999 | Cozzolino et al. |
| 5,906,407 A | 5/1999 | Schmeichel |
| 5,971,446 A | 10/1999 | Lunney, II |
| 6,024,401 A | 2/2000 | Wheatley et al. |
| 6,042,173 A * | 3/2000 | Nett ....................... 296/100.06 |
| 6,221,290 B1 * | 4/2001 | Waddington et al. ...... 264/45.3 |
| 6,340,194 B1 * | 1/2002 | Muirhead et al. ....... 296/100.01 |

* cited by examiner

Primary Examiner—Joseph D. Pape
Assistant Examiner—Patricia Engle
(74) Attorney, Agent, or Firm—Lynn E. Cargill

(57) ABSTRACT

Tonneau cover for placement on a pick-up truck bed, said tonneau cover being made of an energy recoverable foam capable of withstanding the torsional and rotational torque subjected to the truck bed during strenuous off-road conditions without the cover popping off or coming undone at any corner. Further in order to achieve this withstanding of torque and other forces, the cover is attached to the front of the truck bed by at least one hinge which is holding the cover onto the truck by its own independent suspension. This causes a "floating" effect of the cover on top of the truck bed while the truck is; being put to the test on off-road conditions, and allowing the cover to twist and turn during off-road operation. The top surface of the tonneau cover may have a smooth surface, while the underside may be textured like a snakeskin for crumbling upon a rear end collision. Use of the tonneau cover of the present invention results in a significant gas mileage increase.

5 Claims, 4 Drawing Sheets

PICK-UP TRUCK TONNEAU COVER

CROSS REFERENCES TO RELATED APPLICATIONS

This application claims the benefit of U.S. Provisional Application No. 60/193,792 filed on Mar. 31, 2000.

FIELD OF THE INVENTION

This invention relates to a tonneau cover for use on pick-up trucks, and more particularly relates to a flexible, twistable tonneau cover for pick-up trucks which will withstand off-road driving, without having the tonneau cover fall off the truck.

BACKGROUND OF THE INVENTION

Pick-up trucks have recently become very popular in the automobile industry. Tonneau covers are popular to put on the backs of pick-up trucks; however, they have not been able to be used on off-road trucks because they were not flexible enough to withstand off-road driving conditions. The box on a pick-up truck is designed to twist with rotational torque in response to the wheels of the truck falling into holes and pits in roads that are experienced in off-road conditions. Conventional tonneau covers are rigid and generally are rigidly secured to the backs of the pick-up trucks, which means that in off-road conditions they will pop off. Ideally, the tonneau cover should also be able to exhibit rotational torque or twisting of the tonneau cover in order to follow the twisting of the truck bed box.

Conventional tonneau covers are made of structural foam, hard fiberglass or other hard structural materials which do not flex. In addition, their attachment means to the truck body bed are rigid placement devices, such that when the truck bed itself twists, the tonneau cover rips its fasteners out and the cover pops off.

Furthermore, it has been found by EPA testing, that the mileage per gallon experienced by a pick-up with a tonneau cover is approximately 1.6 to 1.8 miles per gallon better than the same pick-up truck without a tonneau cover. The aerodynamical advantages of utilizing a tonneau cover would help the automobile industry greatly in meeting the CAFÉ standards for miles per gallon per vehicle.

Therefore, it would be a great advantage to devise a tonneau cover which would be designed to twist or exhibit rotational torque independently from the truck body box so that such a pick-up truck could still have a tonneau cover on it while in off-road conditions.

BRIEF SUMMARY OF THE INVENTION

In accordance with the present invention, there is disclosed a new pick-up truck tonneau cover which is designed to twist or exhibit rotational torque independent from the truck body box. In essence, the new tonneau cover incorporates two advantages. First, an independent suspension attaches it to the vehicle truck body box. Second, it is made of a new type of material. Furthermore, the underside of the tonneau cover, or the "B" surface, is made of a snakeskin-like configuration such that the tonneau cover would crumple into a myriad of pieces in the event of a rear-end collision.

The independent suspension mentioned above is accomplished by the use of several spring sockets with preloaded springs so that the tonneau cover can independently ride on springs from the truck body box itself. These springs are described in greater detail hereinbelow.

The new material that is used for the tonneau cover is an energy management, or energy recoverable, foam. This material is a urethane foam having a high recovery factor which is derived from closed cell urethane flexible foam. It is sold under the trademark "ENERFLEX" available from Woodbridge Foam Group of Mississauga, Ontario, having a North American division located at 1401 Meijer Boulevard in Troy, Mich. This energy management, or energy recoverable, foam is utilized in order to twist and torque to compensate for off-road conditions. While this type of foam has many of the advantages of structural foam which has been used in conventional or prior art tonneau covers, the foam of the instant invention has a recovery factor such that if it is dented or twisted, it exhibits a memory to return it to its original shape without losing any of its integrity or strength.

Lastly, the "B" surface is made of numerous scale-like projections and protrusions occurring longitudinally perpendicular to the axis of the truck in order to prevent decapitation of the occupants of the vehicle in the event of a rear-end collision. These scale-like protrusions and projections will act as a crumple zone and burst into a myriad of pieces in the event of a rear-end collision. These concepts will be discussed with greater detail hereinbelow.

DETAILED DESCRIPTION

Figure 1:
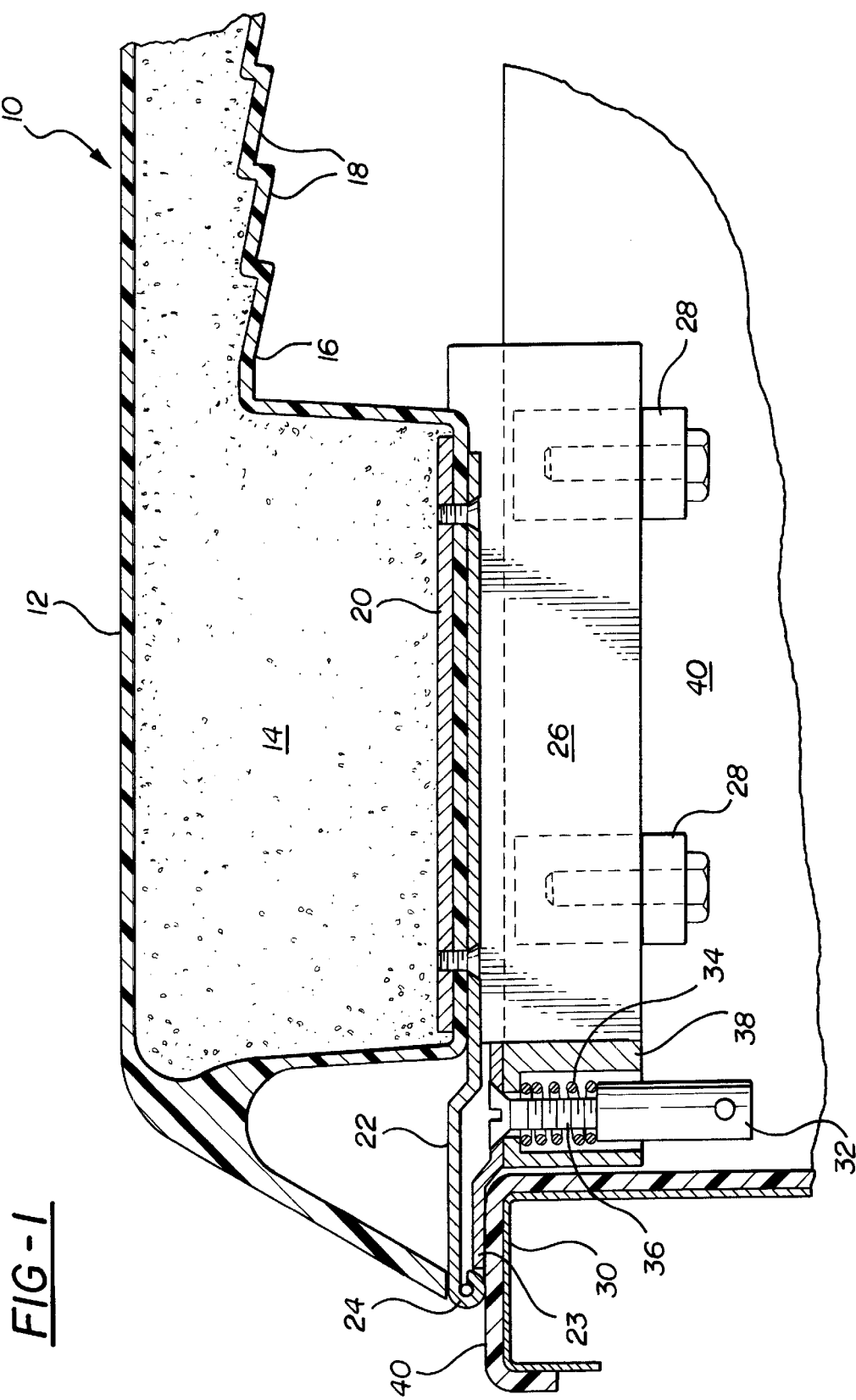
FIG. 1 is a cut-away side view of the attachment portion in the front of the truck bed, including the corner piece of the tonneau cover.

In accordance with the present invention, there is disclosed a tonneau cover which is generally denoted by numeral 10. Tonneau 10 includes a top or "A" surface 12 which covers the underlying structure made of energy management, or energy recoverable, foam 14. The underneath or "B" surface includes scale-like projections 18, also known as crumple elements 18. On the bottom of the foam 14 is a reinforcing plate 20, which comes into proximal contact with upper hinge mounting flange 22 and is secured thereto.

Lower hinge mounting flange 23 is connected to upper hinge mounting flange 22 by hinge 24. The lower hinge mounting flange 23 is secured to the spring socket 38 by a spring stud 36. This entire assembly is attached to the front rail of a truck body 30 by a hinge 24. A spring retainer 32 holds spring 34 in place within the spring socket 38. This spring system acts as the independent suspension for attaching the tonneau to the truck in a manner such that it will exhibit rotational torque during off-road condition operations.

Figure 2:
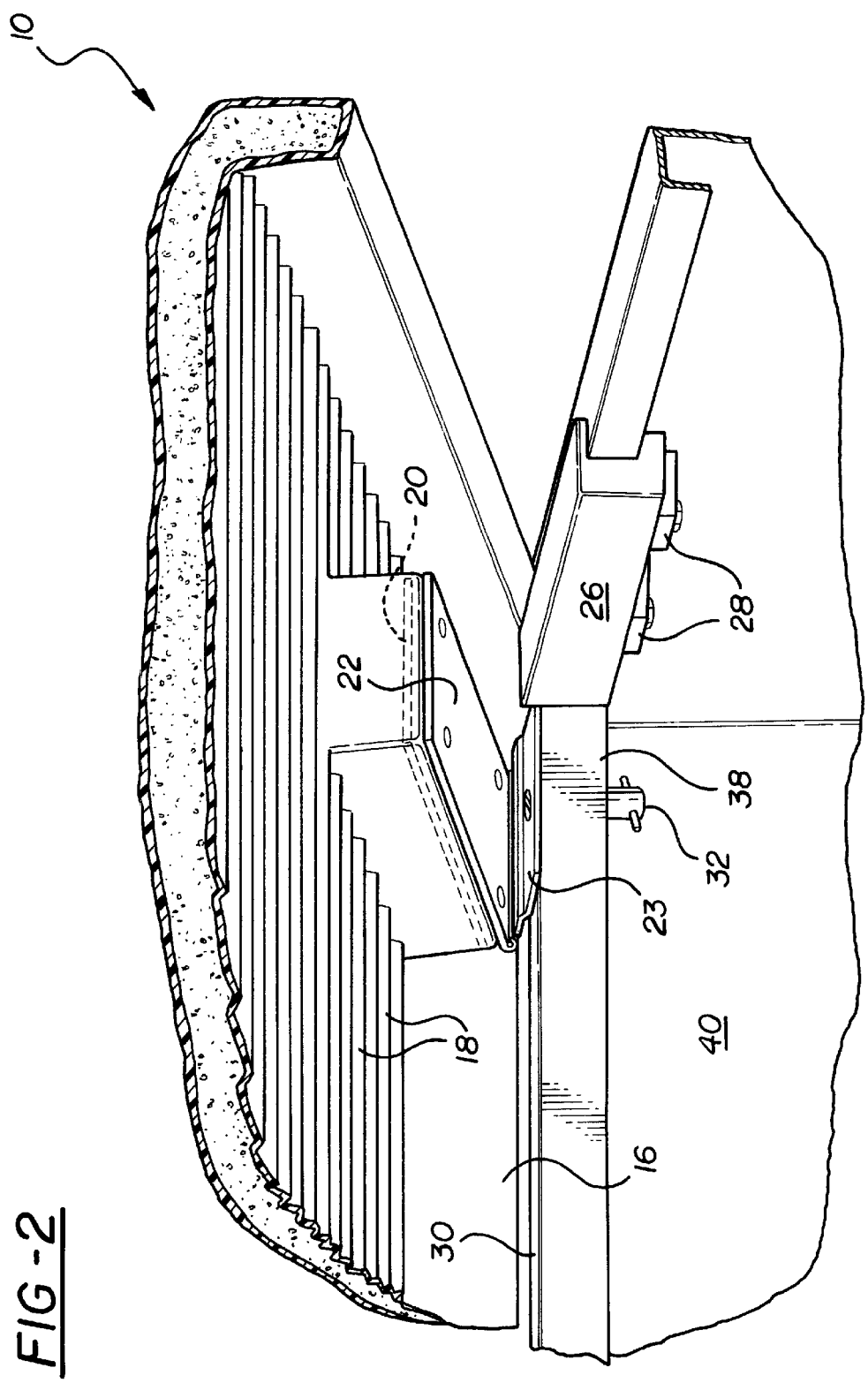
FIG. 2 is a frontward facing perspective elevational view of one of the hinged independent suspension units.

In FIG. 2 one can see the underneath or "B" surface 16 of tonneau cover 10. The crumple elements 18 are illustrated therein. The reinforcing plate 20 can be seen as attached to the lower hinge mounting flange 23 and the spring sockets 38 are shown in position. A side member attaching arm 26 includes clamps 28 for holding the hinge mechanism and assembling onto the side of truck bed 40. It is envisioned that ultimately a single spring socket 38 may be utilized in order to maximize the independent suspension feature which is so beneficial to the operation of the present invention. This figure shows the hinge mechanism toward the front of the truck, or the front of the truck bed attached to the rearmost portion of the truck cab.

Figure 3:
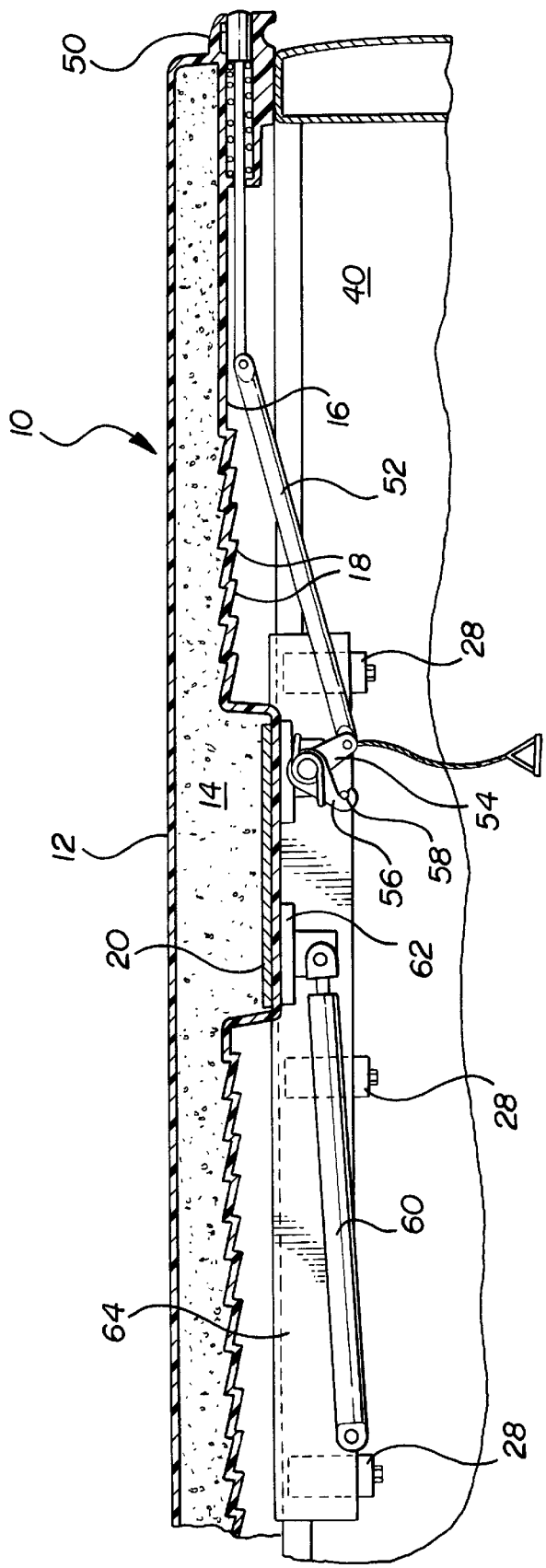
FIG. 3 is a cut-away side view of the latch and gas strut configuration.

Moving now to FIG. 3, there is shown again the tonneau cover 10 having an upper surface 12, and being composed of the energy management or energy recoverable foam 14. When operating the tonneau cover, there must be a latch or actuator at the rear of the truck in order to be desirable. In the present invention, there is a latch actuator 50 which is in mechanical communication with a rod 52 which moves latch arm 54 to place latch 56 in contact with latch pin 58. When latch actuator 50 is pulled forward, the latch rod 52 pulls the latch arm 54 towards the back of the pick-up truck, and pushes latch 56 away from latch pin 58, thereby disengaging the tonneau cover from the truck body bed 40. Once it has been engaged and released, a gas strut 60 helps to keep the tonneau cover open. Gas strut 60 is attached to tonneau cover 10 by a tonneau bracket 62 at one end, and side member attachment 64 attaches the strut to the side of the truck bed. Any other means for supporting the tonneau cover when released in up position may be known to those who are skilled in the art.

Figure 4:
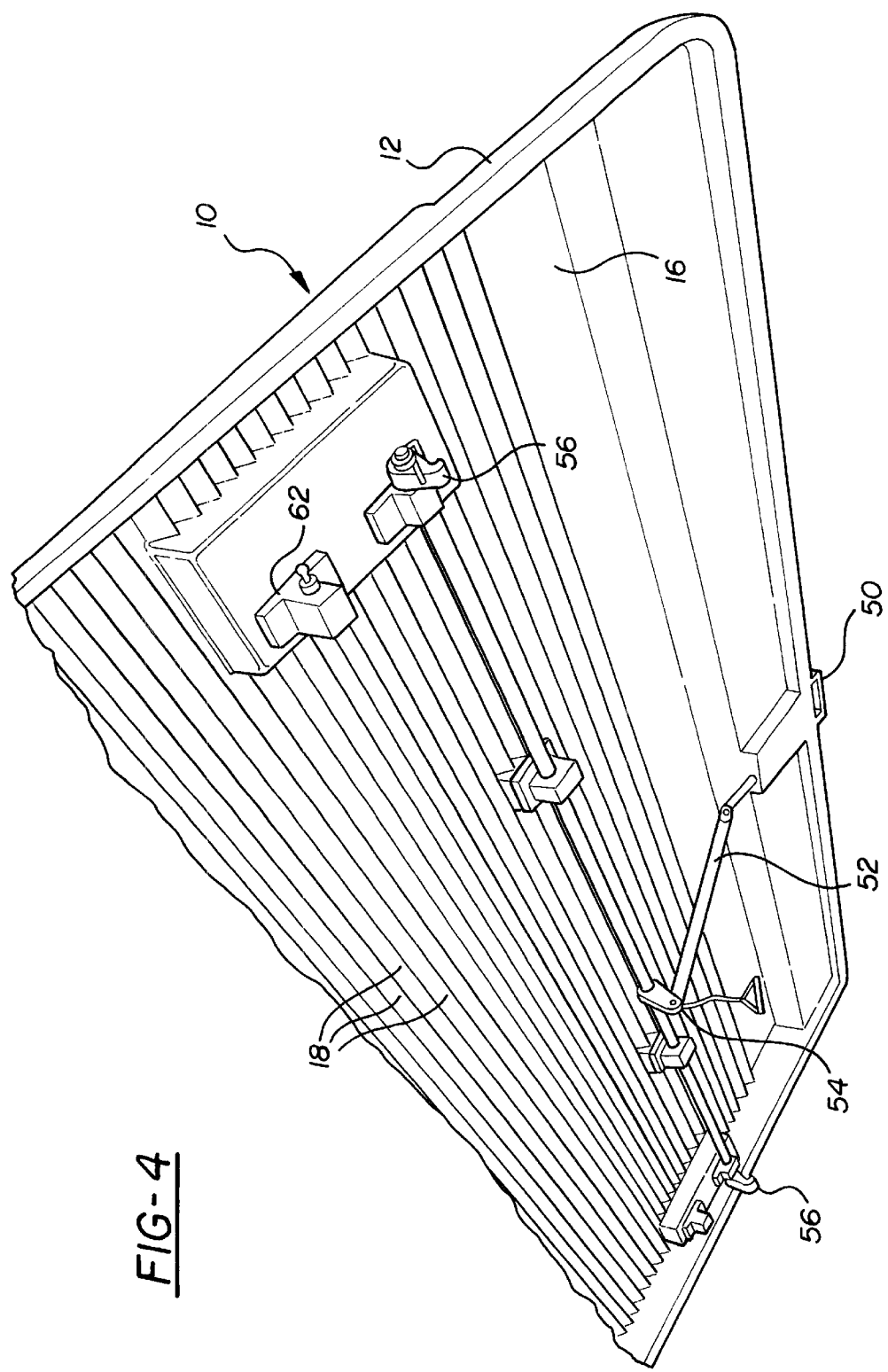
FIG. 4 is an underneath surface view in the perspective, showing the location of the latch and gas strut bracket.

Looking now to FIG. 4, the underneath or "B" surface of the tonneau cover is shown in perspective. Crumple elements 18 are shown as the longitudinally extending snake-skin like crumple elements which would collapse upon a rearend collision so as not to harm the occupants of the truck cab. As one can see, the hand latch actuator 50 is located at the rear of the truck bed. The crumple elements are facing in such a manner that the downwardly extending and facing flat portion of the snake scales face toward the back of the truck, and the portion of the snake scale which is less in height of material faces towards the front of the truck. Other means known to those in the art could also be attached to underneath surface 16 so as to avoid decapitation of the occupants of the truck cab in the event of a rearend collision. Latch actuator 50 is in mechanical communication with latch rod 52 and latch arm 54. There is also an emergency pull 55 so that children and anyone else who might get caught in the truck bed covered by the tonneau cover can release the latch arm and free themselves from the truck bed. Latches 56 are moved into place by latch bar 58 held in place and supported by latch bar supports 60. Gas strut tonneau bracket 62 is shown in place, but without the gas strut being attached.

Therefore, in accordance with the objects and advantages mentioned above, the present invention meets or exceeds those objects and advantages by providing a flexible tonneau cover which is flexibly attached to the truck via hinges that are independently suspended from the back of the truck.

While the invention has been disclosed hereinabove with reference to the drawings, there are no limitations on the embodiments which are within the scope of the present invention, and the invention is merely limited by the scope of the appended claims.

What is claimed is:

1. A pick-up truck tonneau cover for attaching to and covering of a pick-up truck bed liner, comprising:

a twistable tonneau cover made of an energy recoverable foam cover having a smooth surface on top of the cover, and a textured underside having numerous scale-like projections and protrusions occurring longitudinally perpendicular to the lengthwise axis of the truck, said protrusions and projections acting as a crumple zone in the event of a rear end collision;

at least one hinge for attaching the tonneau cover to the truck bed liner; and at least one independent suspension unit attached to the at least one hinge and to the underside of the tonneau cover to act as a shock absorber during off-road operating conditions.

2. The tonneau cover of claim 1, wherein the energy recoverable foam is a urethane foam having a high recovery factor which is derived from closed cell urethane flexible foam.

3. The tonneau cover of claim 1, wherein the textured underside is made of numerous scale-like projections and protrusions occurring longitudinally perpendicular to the axis of the truck, acting as a crumple zone intended to break into a myriad of pieces in the event of a rear end collision.

4. The tonneau cover of claim 1, further comprising at least one hinge mounting flange attached to the underside of the cover.

5. The tonneau cover of claim 4, further comprising at least one reinforcement plate in proximal contact with and being attached to the underside of the tonneau cover for reinforcing the hinge-truck connection.

* * * * *